(12) United States Patent
Suetake

(10) Patent No.: US 6,272,918 B1
(45) Date of Patent: Aug. 14, 2001

(54) THERMAL FLOW METER AND FUEL CONTROLLER

(75) Inventor: Naruki Suetake, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/188,376

(22) Filed: Nov. 10, 1998

(30) Foreign Application Priority Data

Jun. 1, 1998 (JP) .................................................. 10-151560

(51) Int. Cl.[7] ...................................................... G01F 1/68
(52) U.S. Cl. ...................................................... 73/204.14
(58) Field of Search ........................... 73/204.11, 204.14, 73/204.15, 204.25, 118.1, 119 N

(56) References Cited

U.S. PATENT DOCUMENTS

| | | | |
|---|---|---|---|
| 3,603,147 | * 9/1971 | Dorman | 73/204.14 |
| 3,754,797 | * 8/1973 | Rodi et al. | 303/159 |
| 3,832,009 | * 8/1974 | Leiber et al. | 303/168 |
| 4,335,605 | * 6/1982 | Boyd | 73/204.14 |
| 4,888,987 | * 12/1989 | Zhang | 73/204.14 |
| 4,934,188 | * 6/1990 | Tanimoto et al. | 73/204.14 |

FOREIGN PATENT DOCUMENTS 2-216420  8/1990  (JP) .

* cited by examiner

*Primary Examiner*—Harshad Patel
(74) *Attorney, Agent, or Firm*—Sughrue, Mion, Zinn, Macpeak & Seas, PLLC

(57) ABSTRACT

Disclosed is a thermal flow meter which is relatively inexpensive and operates with high accuracy and reliability, and a fuel controller using the thermal flow meter adapted for internal combustion engines. The thermal flow meter comprises a sensor unit for detecting a flow rate signal, a reference power supply for generating a reference signal, and a signal switch for selectively outputting the flow rate signal from the sensor unit and the reference signal from the reference power supply. The flow rate signal and the reference signal are alternately output from the same output terminal.

10 Claims, 5 Drawing Sheets

FREQUENCY INFORMATION = 1/T1
DUTY INFORMATION = T2/T1

THERMAL FLOW METER AND FUEL CONTROLLER

BACKGROUND OF THE INVENTION

1. Field of the Invention

The present invention relates to a thermal flow meter for detecting the flow rate of a fluid with a thermosenstive resistance, and more particularly to a thermal flow meter outputting a pulse-like signal corresponding to the flow rate of a fluid, and a fuel controller using the thermal flow meter adapted for, e.g., internal combustion engines.

2. Description of the Related Art

Generally, very high accuracy is required in flow rate conversion that is to be performed on a signal of a thermal flow meter in a fuel controller for, e.g., internal combustion engines. Therefore, a high-accuracy reference power supply is provided in the fuel controller, and A/D conversion is made on a flow rate signal on the basis of the reference power supply.

FIG. 9 is a block diagram showing an example in which a conventional thermal flow meter outputting a voltage signal is employed in a fuel controller for internal combustion engines.

In FIG. 9, a thermal flow meter 1 is connected to a fuel injection controller 2 which comprises a high-accuracy reference power supply 3, an A/D converter 4, and a microcomputer 5. The thermal flow meter 1 includes an amplifier (not shown) which amplifies a flow rate signal applied thereto and outputs an amplified signal.

A voltage signal output from the thermal flow meter 1 is applied to the A/D converter 4 in the fuel injection controller 2, and the applied voltage signal is A/D-converted on the basis of the high-accuracy reference power supply 3. A resulting digital signal is used to carry out a process of fuel injection amount control in the microcomputer 5.

FIG. 10 is a block diagram showing an example in which a conventional thermal flow meter outputting a current signal is employed in a fuel controller for internal combustion engines, the example being disclosed in, e.g., Japanese Unexamined Patent Publication No. 2-216420.

In FIG. 10, a high-accuracy reference resistance 6 is disposed between the input side of an A/D converter 4 and the ground side. The other structure is the same as shown in FIG. 9.

In this example, a current signal output from a thermal flow meter 1 is subjected to current/voltage transformation (I/V transformation) by the high-accuracy reference resistance 6 in a fuel injection controller 2, and then applied to the A/D converter 4. The applied voltage signal is A/D-converted on the basis of a high-accuracy reference power supply 3. A resulting digital signal is used to carry out a process of fuel injection amount control in a microcomputer 5.

If a resistance value of the high-accuracy reference resistance 6 has a temperature characteristic or changes depending on the individuals, a resulting variation directly gives rise to an error of the flow rate. For this reason, the high-accuracy reference resistance 6 is usually formed of a resistor which is expensive and has very high accuracy.

In the conventional thermal flow meters, however, when it is used in combination with the fuel injection controller, the high-accuracy reference power supply is required for the A/D converter in the fuel injection controller to suppress an error that may occur during the A/D conversion. Also, in the thermal flow meter outputting a current signal, a high-accuracy reference resistance, which has a superior temperature characteristic or small variations (in temperature characteristic, resistance value, etc.) depending on the individuals, is required to suppress an error that may occur in the current/voltage transformation. There has been hence a problem that the conventional thermal flow meters are necessarily expensive.

SUMMARY OF THE INVENTION

With a view of solving the problem as set forth above, an object of the present invention is to provide a thermal flow meter which is relatively inexpensive and operates with high accuracy and reliability, and a fuel controller using the thermal flow meter adapted for internal combustion engines.

A thermal flow meter according to a first aspect of the present invention comprises a flow rate detecting unit for detecting a flow rate signal, a reference power supply for generating a reference signal, and switching means for selectively outputting the flow rate signal from the flow rate detecting unit and the reference signal from the reference power supply. With the first aspect of the present invention, the flow rate signal and the reference signal can be transmitted by one signal line. Therefore, highly accurate signals can be transmitted without being affected by resistance components of the line and an interface, etc. Further, the number of transmission lines can be reduced.

A thermal flow meter according to a second aspect of the present invention further comprises timing signal generating means, in addition to the first aspect, wherein the switching means selectively outputs the flow rate signal and the reference signal in response to a timing signal from the timing signal generating means. With the second aspect of the present invention, the need of inputting the timing signal from the outside is eliminated and the number of transmission lines can be reduced.

A thermal flow meter according to a third aspect of the present invention further comprises, in addition to the first aspect, amplifying means for amplifying the flow rate signal and the reference signal and then outputting the amplified signals as voltage signals. With the third aspect of the present invention, the flow rate can be measured without being affected by the accuracy of the amplifying means.

A thermal flow meter according to a fourth aspect of the present invention further comprises, in addition to the first aspect, amplifying means for amplifying the flow rate signal and the reference signal and then outputting the amplified signals as current signals. With the fourth aspect of the present invention, the effect of a difference in GND potential between the thermal flow meter and a fuel controller, for example, connected to the thermal flow meter can be eliminated.

In a thermal flow meter according to a fifth aspect of the present invention, in addition to the first aspect, plural items of information are output via a single transmission line by using plural factors selected from among a frequency, duty and voltage level which are contained in the flow rate signal. With the fifth aspect of the present invention, the number of transmission lines can be reduced.

A fuel controller according to a sixth aspect of the present invention is made up of a thermal flow meter comprising a flow rate detecting unit for detecting a flow rate signal, a reference power supply for generating a reference signal, and switching means for selectively outputting the flow rate signal from the flow rate detecting unit and the reference signal from the reference power supply, and signal processing means for calculating a flow rate of fuel based on the flow rate signal and the reference signal from the thermal flow meter. With the sixth aspect of the present invention, the flow rate of fuel can be controlled without being affected by the accuracy of a current detecting resistance in a fuel control system.

In a fuel controller according to a seventh aspect of the present invention, in addition to the sixth aspect, the signal processing means discriminates an input signal from the thermal flow meter and handles the input signal as the reference signal when the input signal is outside a range of the flow rate signal. With the seventh aspect of the present invention, the flow meter signal and the reference signal can be easily discriminated from each other.

A fuel controller according to an eighth aspect of the present invention, in addition to the sixth aspect, the signal processing means determines the thermal flow meter to be failed when the input signal from the thermal flow meter exceeds a predetermined value and continues for a predetermined time. With the eighth aspect of the present invention, since a time factor is essentially added as one of the conditions for failure determination, erroneous failure determination can be avoided even if the reference signal has a level falling within the range set for the failure determination.

A fuel controller according to a ninth aspect of the present invention, in addition to the sixth aspect, an input impedance of the signal processing means is set to be low. In the thermal flow meter outputting a voltage signal, particularly, a current amount passing the signal line can be increased without reducing accuracy. With the ninth aspect of the present invention, an improvement in contact reliability and noise resistance of a signal transmission system, which includes contact resistance of a connector, etc., can be therefore realized.

A fuel controller according to a tenth aspect of the present invention, in addition to the sixth aspect, the signal processing means is constituted by an A/D converter and a microcomputer. With the tenth aspect of the present invention, the configuration of the fuel controller can be simplified.

A fuel controller according to an eleventh aspect of the present invention, in addition to the tenth aspect, the reference signal from the thermal flow meter is held and the held reference signal is used as a reference voltage for the A/D converter. With the eleventh aspect of the present invention, the need of executing a division of in the process of calculating the flow rate of fuel is eliminated and hence the processing speed can be increased.

DESCRIPTION OF THE PREFERRED EMBODIMENTS

Preferred embodiments of the present invention will be described below with reference to the drawings, taking as an example the case where the invention is applied to a fuel controller for internal combustion engines.

Embodiment 1.

Figure 1:
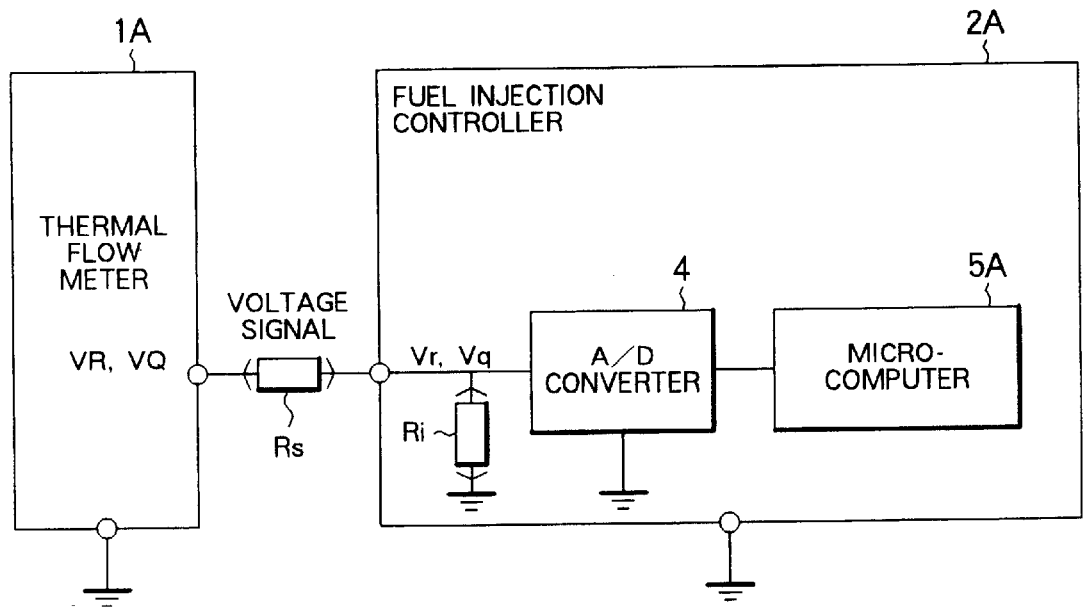
FIG. 1 is a block diagram showing Embodiment 1 of the present invention.
Figure 9:
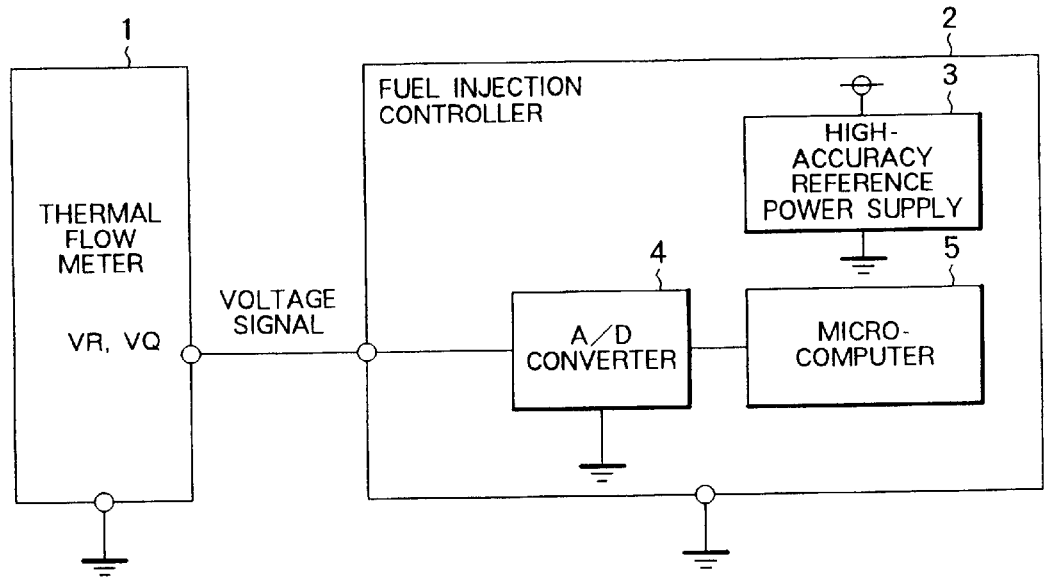
FIG. 9 is a block diagram showing a conventional fuel controller.

FIG. 1 is a block diagram showing Embodiment 1 of the present invention. In FIG. 1, components corresponding to those in FIG. 9 are denoted by the same reference numerals and the detailed description thereof is omitted here.

As shown in FIG. 1, a fuel controller comprises a thermal flow meter 1A outputting a voltage signal, and a fuel injection controller 2A. The fuel injection controller 2A includes an A/D converter 4 and a microcomputer 5A. Incidentally, the A/D converter 4 and the microcomputer 5A cooperatively constitute signal processing means.

Figure 2:
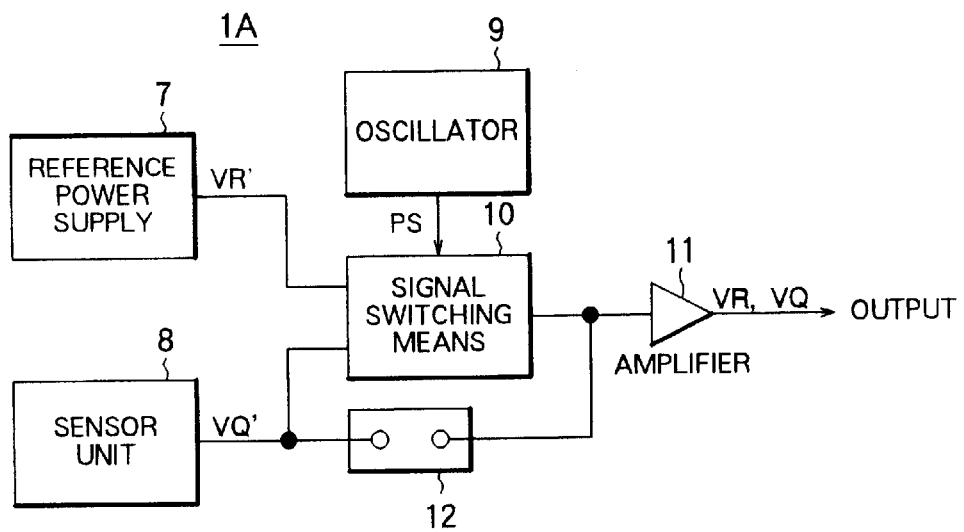
FIG. 2 is a block diagram showing a principal part of Embodiment 1 of the present invention.

FIG. 2 is a block diagram showing one example of internal configuration of the thermal flow meter 1A.

In FIG. 2, the thermal flow meter 1A comprises a reference power supply 7 for generating a reference signal, a sensor unit 8, for generating a flow rate signal, an oscillator 9, as timing signal generating means, for alternately outputting H (high-level)/L (low-level) signals at a predetermined cycle, signal switching means 10 for switching over the reference signal and the flow rate signal in response to an output of the oscillator 9, an amplifier 11, as amplifying means, for amplifying the reference signal and the flow rate signal selectively output from the signal switching means 10, and a jumper line 12 disposed between the output side of the sensor unit 8 and the input side of the amplifier 11.

The operation of Embodiment 1 will now be described with reference to FIGS. 3 and 4.

Figure 3:
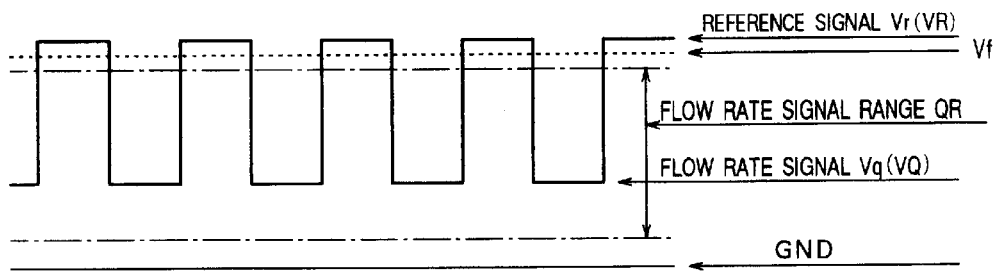
FIG. 3 is a chart for explaining the operation of Embodiment 1 of the present invention.

In the thermal flow meter 1A, as seen from FIG. 3, the signal switching means 10 switches over a reference signal VR' and a flow rate signal VQ' at the timing (e.g., falling) of a square-wave signal PS from the oscillator 9 so that the reference signal VR' and the flow rate signal VQ' are alternately applied to the amplifier 11. The amplifier 11 amplifies the applied signals at a predetermined amplification rate and then outputs a reference signal VR and a flow rate signal VQ resulting from the amplification.

Assuming here that the amplification rate of the amplifier 11 is G, the reference signal from the reference power supply 7 is VR', and the flow rate signal from the sensor unit 8 is VQ', the reference signal VR and the flow rate signal VQ resulting from the amplification, expressed by the following formulae, are produced respectively at the output side of the amplifier 11, i.e., at the output side of the thermal flow meter 1A:

$$VR = VR' \times G \quad (1)$$

$$VQ = VQ' \times G \quad (2)$$

Considering the amplification rate G in a like manner to the later-described formula (6), error factors attributable to the amplification rate G are canceled and hence an error of G is not included in the result.

Accordingly, the amplifier 11 is not required to have high accuracy and can be realized with an inexpensive configuration. Note that the amplifier 11 may be dispensed with.

Also, since the oscillator 9 is provided in the thermal flow meter 1A, any signal is not needed to be taken from the external, and the number of connector terminals can be reduced.

Further, where it is not desired that the oscillator 9 be provided in the thermal flow meter 1A, an oscillation signal or a timing signal may be taken from the external.

Additionally, where it is desired to employ the conventional specifications for an interface, a flow meter may be provided with the conventional specifications by omitting the reference power supply 7, the oscillator 9 and the signal switching means 10 in FIG. 2, and connecting the sensor unit 8 directly to the amplifier 11 through the jumper line 12.

In other words, the jumper line 12 serves to make H/W used in common between the conventional specifications and the specifications of the present invention.

Signals output from the thermal flow meter 1A are applied, as a reference signal Vr and a flow rate signal Vq resulting respectively from later-described impedance transformation of the reference signal VR and the flow rate signal VQ, to the A/D converter 4 of the fuel injection controller 2A. The A/D-converted signals are alternately transmitted as digital signals to the microcomputer 5A.

Figure 4:
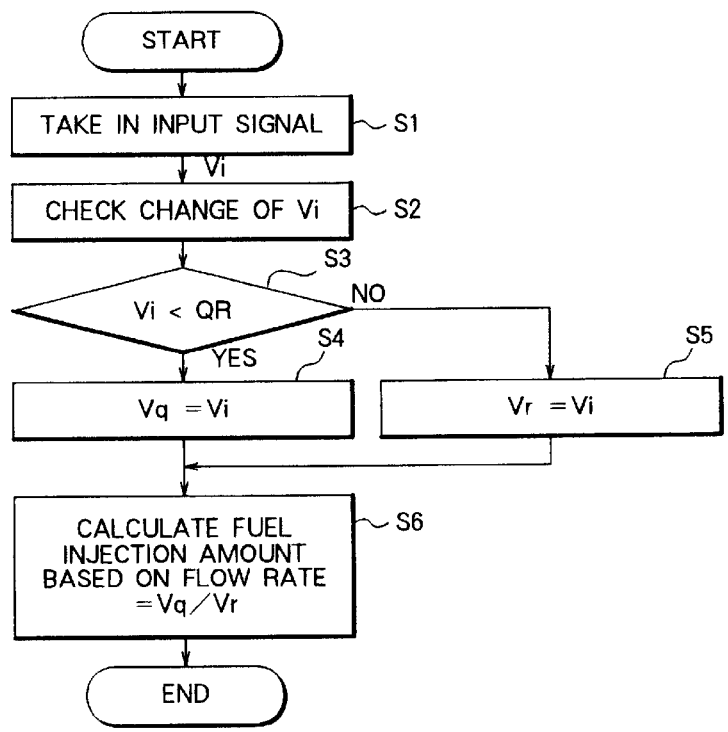
FIG. 4 is a flowchart for explaining the operation of Embodiment 1 of the present invention.

The microcomputer 5A executes processing of the digital signals to carry out discrimination and storage of the signals as shown in FIG. 4.

More specifically, in FIG. 4, the microcomputer 5A takes in, as an input signal Vi, the digital signal from the A/D converter 4 (step S1), checks a change (rising or falling) of the input signal Vi (step S2), and then determines whether or not the change of the input signal Vi is within a flow rate signal range QR (see FIG. 3)(step S3).

If the change of the input signal Vi is within the flow rate signal range QR, that input signal Vi is regarded as the flow rate signal Vq and is once stored in a memory (not shown) (step S4). If the change of the input signal Vi is not within the flow rate signal range QR, that input signal Vi is regarded as the reference signal Vr and is once stored in the memory (step S5).

Next, in step S6, a fuel injection amount is calculated based on a result obtained from the following formula (3):

$$\text{flow rate} = Vq/Vr \qquad (3)$$

Assuming now that the signal line impedance of an interface between the thermal flow meter 1A and the fuel injection controller 2A is Rs, the input impedance of the fuel injection controller 2A is Ri, the voltage level of the reference signal in the thermal flow meter 1A is VR, the voltage level of the flow rate signal in the thermal flow meter 1A is VQ, the voltage level of the reference signal applied to the A/D converter 4 is Vr, and the voltage level of the flow rate signal applied to the A/D converter 4 is Vq, the following formulae hold:

$$Vr = \{Ri/(Rs+Ri)\} \times VR \qquad (4)$$

$$Vq = \{Ri/(Rs+Ri)\} \times VQ \qquad (5)$$

Putting the formulae (4) and (5) in the above formula (3) results in:

$$\text{flow rate} = Vq/Vr = \{Ri/(Rs+Ri)\} \times VQ/\{Ri/(Rs+Ri)\} \times VR = VQ/VR \qquad (6)$$

This means that the effects of the signal line and the input impedance are attributable to the same components and are canceled. Accordingly, a signal represented by the flow rate signal/the reference signal is precisely transmitted via a route of the thermal flow meter 1A→the A/D converter 4→the microcomputer 5A.

Also, in the flow meter outputting a voltage signal, by making the input impedance Ri small, a current amount passing the signal line can be increased without reducing accuracy. An improvement in contact reliability and noise resistance of a signal transmission system, which includes contact resistance of a connector, etc., can be therefore realized.

Further, since the reference signal and the flow rate signal are transmitted in the form of square waves by using one signal line, there is no need of providing an additional signal line and connector for transmitting the reference signal from the thermal flow meter 1A to the fuel injection controller 2A in spite of the reference power supply being provided on the side of the thermal flow meter 1A.

Moreover, since the reference signal is set to a level outside the output range of the flow rate signal as shown in FIG. 3, signal discrimination between the reference signal and the flow rate signal can be easily made by determining the signal levels.

Additionally, where 5 V is divided using 10 bits, for example, in the A/D conversion, there results in a resolution (digital error) of 1 bit≈5 mV. Since the level of the reference signal is set to be higher than the output range of the flow rate signal as shown in FIG. 3, a value of the flow rate signal/the reference signal can be calculated with a smaller effect caused by a digital error of the reference signal than would be the case of setting the level of the reference signal to be smaller than the output range of the flow rate signal.

Embodiment 2.

Figure 5:
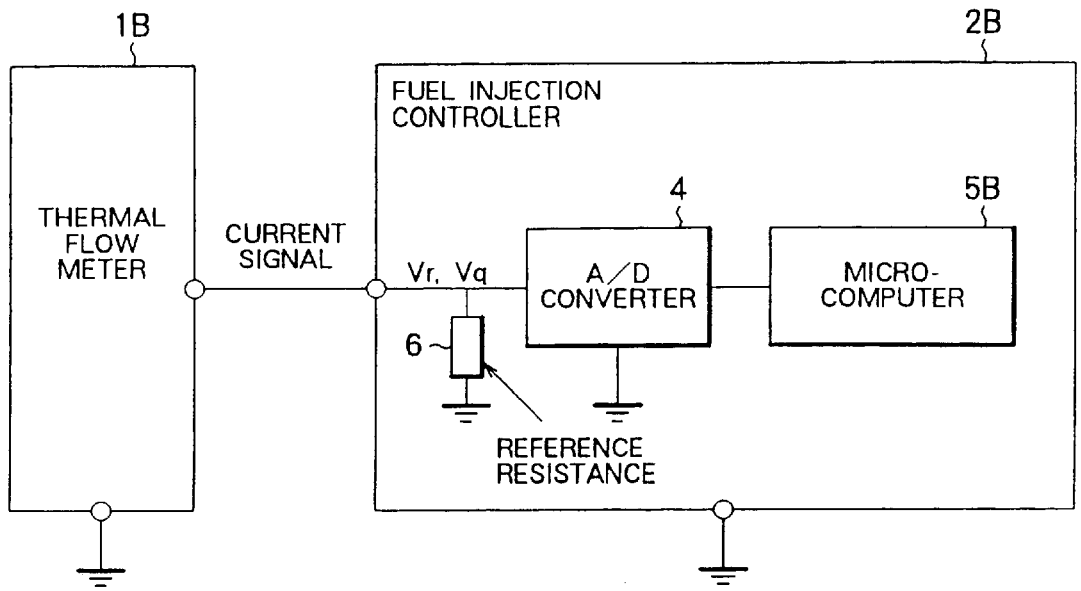
FIG. 5 is a block diagram showing Embodiment 2 of the present invention.

FIG. 5 is a block diagram showing Embodiment 2 of the present invention. In FIG. 5, components corresponding to those in FIG. 1 are denoted by the same reference numerals and the detailed description thereof is omitted here.

As shown in FIG. 5, a fuel controller comprises a thermal flow meter 1B outputting a current signal, and a fuel injection controller 2B. The fuel injection controller 2B includes an A/D converter 4, a microcomputer 5B, and a reference resistance 6 disposed between the input side of the A/D converter 4 and the ground side. Incidentally, the A/D converter 4 and the microcomputer 5B cooperatively constitute signal processing means.

Figure 6:
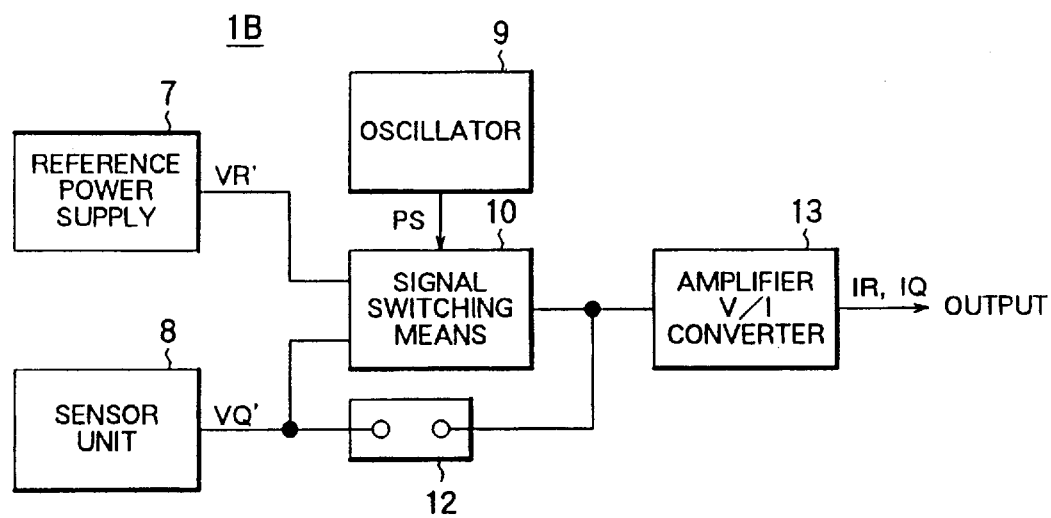
FIG. 6 is a block diagram showing a principal part of Embodiment 2 of the present invention.

FIG. 6 is a block diagram showing one example of internal configuration of the thermal flow meter 1B.

The thermal flow meter 1B has the same configuration as that of the thermal flow meter 1A shown in FIG. 2 except that the amplifier 11 in FIG. 2 is replaced by an amplifier & V/I transformer 13.

The operation of Embodiment 2 will now be described.

In the thermal flow meter 1B, as seen from FIG. 3, the signal switching means 10 switches over a reference signal VR' and a flow rate signal VQ' at the timing (e.g., falling) of a square-wave signal PS from the oscillator 9 so that the reference signal VR' and the flow rate signal VQ' are alternately applied to the amplifier & V/I transformer 13. The amplifier & V/I transformer 13 amplifies the applied signals at a predetermined amplification rate and then outputs a reference signal IR and a flow rate signal IQ resulting from V/I transformation subsequent to the amplification.

Before being applied to the A/D converter 4 of the fuel injection controller 2B, signals output from the thermal flow meter 1B, i.e., the reference signal IR and the flow rate signal IQ, are essentially transformed by the reference resistance 6 into voltage signals which are then supplied to the A/D converter 4. The A/D-converted signals are alternately transmitted as digital signals to the microcomputer 5B.

The subsequent signal processing in the microcomputer 5B can be executed in a like manner to Embodiment 1.

Thus, the operation of this Embodiment 2 can be basically considered by replacing the input impedance Ri in Embodiment 1 with the reference resistance 6. In other words, as with Embodiment 1, a signal represented by the flow rate signal/the reference signal is transmitted via a route of the thermal flow meter 1B→I/V transformation by the reference resistance 6→the A/D converter 4→the microcomputer 5B.

Figure 10:
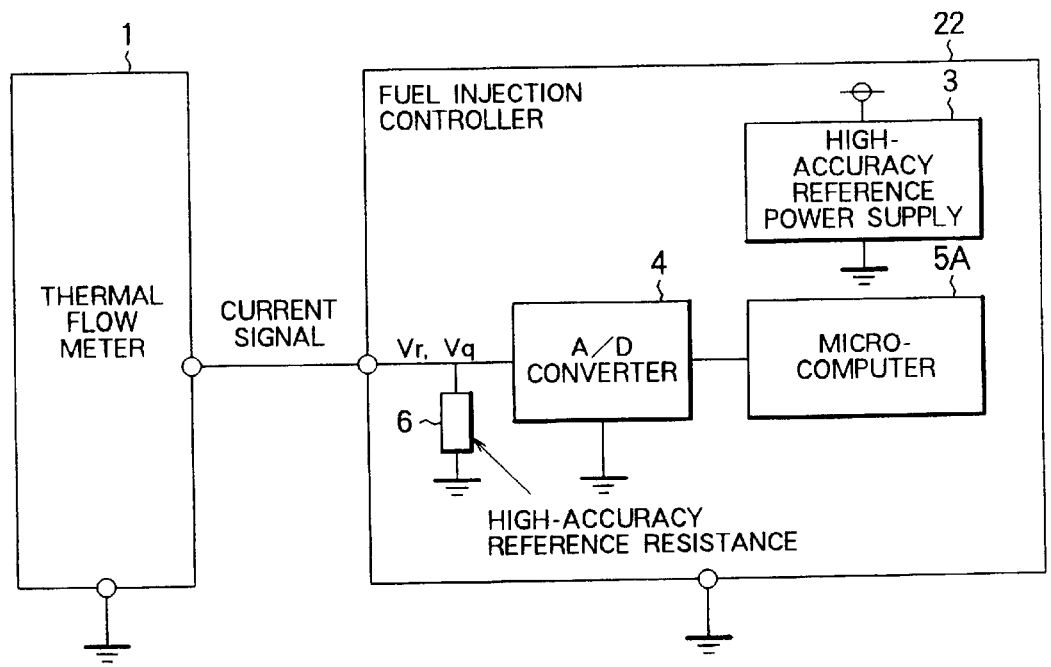
FIG. 10 is a block diagram showing another conventional fuel controller.

In this Embodiment 2, therefore, the flow rate signal/the reference signal=Vq/Vr=VQ/VR is resulted and the terms of the input impedance Ri are essentially canceled; hence an expensive and high-accuracy resistor, which should be used in the conventional flow meter shown in FIG. 10, is no longer required.

Accordingly, in this Embodiment 2, the signals are precisely transmitted regardless of accuracy of the reference resistance 6 used for the I/V transformation. Also, even if there is a difference in GND potential between the thermal flow meter 1B and the fuel injection controller 2B, the difference does not act as an error factor. As a result, in addition to the advantages with the above Embodiment 1, it is possible to realize signal transmission with high accuracy.

Embodiment 3.

Figure 7:
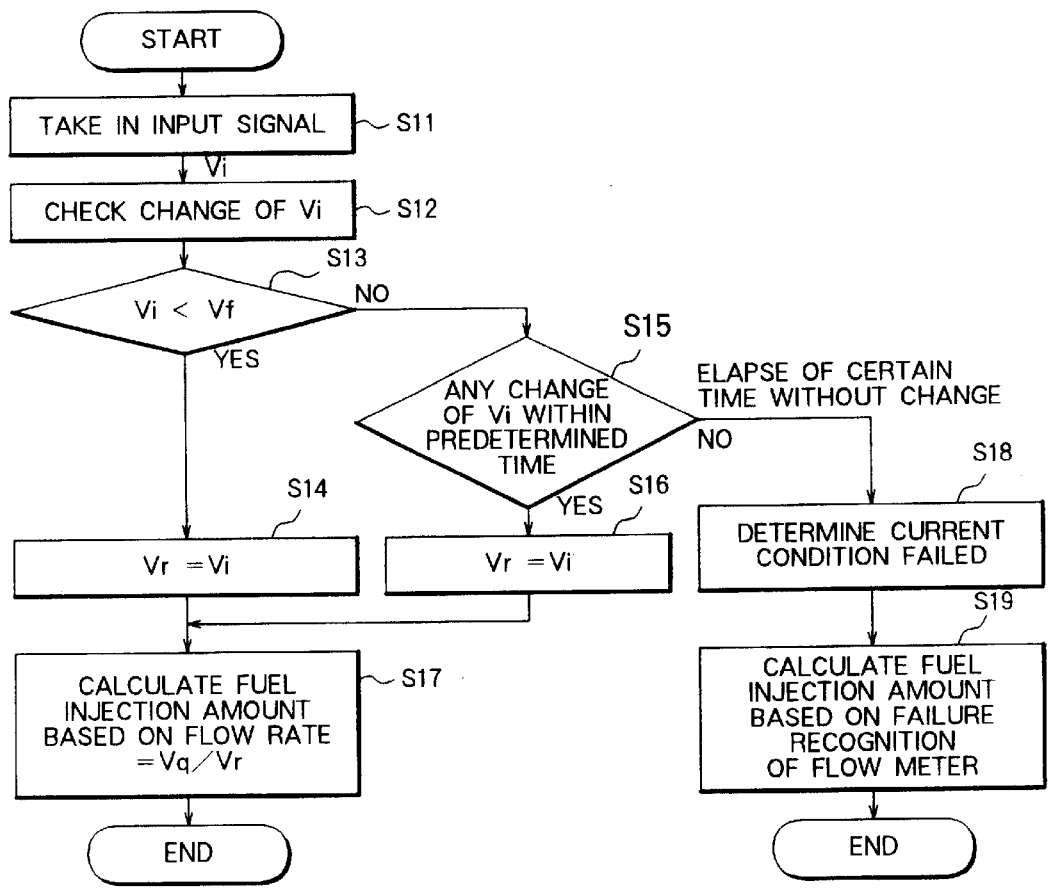
FIG. 7 is a flowchart for explaining the operation of Embodiment 3 of the present invention.

FIG. 7 is a flowchart showing Embodiment 3 of the present invention.

Note that the circuit configuration of this Embodiment 3 can be constructed similarly to that of the above Embodiment 1 or 2 and hence the detailed description thereof is omitted here.

This Embodiment 3 represents one example of the case including failure recognition to determine a failure of the thermal flow meter. Hitherto, the transmitted signal has been only a flow rate signal and is held within the predetermined range of flow rate output except noise components caused by crosstalk and so on. It has been therefore customary for a conventional fuel injection controller to make failure recognition by determining any signal outside the predetermined range of flow rate output to be a failure signal resulting from disconnection or short circuit occurred in a thermal flow meter or a transmission line. In FIG. 4, for example, if the transmission line is disconnected or short-circuited to the ground, a resulting signal has a level lower than the predetermined range of flow rate output and can be determined to be a failure signal by the conventional method. However, if the transmission line is short-circuited to an on-level of the reference signal, a resulting signal cannot be determined to be a failure signal by the conventional method when a signal level for failure determination is set almost the same as that of the reference signal.

To avoid the above problem, in this Embodiment 3, a threshold Vf used for signal discrimination to determine a failure of the thermal flow meter is set to a level between the flow rate signal Vq and the reference signal Vr, as shown in FIG. 3. The signal discrimination is performed based on comparison with the threshold Vf.

By so setting, a failure process can be executed by determining the thermal flow meter to be failed if the flow rate signal is not input to the fuel injection controller for a time sufficiently longer than the cycle of the reference signal.

The operation of this Embodiment 3 for carrying out such a failure process will be described below with reference to a flowchart of FIG. 7, taking as an example the case of employing the circuit configuration of Embodiment 1 shown in FIGS. 1 and 2.

The microcomputer 5A takes in, as an input signal Vi, the digital signal from the A/D converter 4 (step S11), checks a change (rising or falling) of the input signal Vi (step S12), and then determines whether or not the input signal Vi is larger than the threshold Vf (step S13).

If the input signal Vi is smaller than the threshold Vf, that input signal Vi is regarded as the flow rate signal Vq and is once stored in a memory (not shown) (step S14). If the input signal Vi is larger than the threshold Vf, it is then determined whether or not there occurs a change of the input signal Vi within a predetermined time, e.g., a time sufficiently longer than the cycle of the reference signal (step S15). If there occurs a change, that input signal Vi is regarded as the reference signal Vr and is once stored in the memory (step S16).

Next, in step S17, a fuel injection amount is calculated based on the result obtained from the above formula (3), i.e., the detected flow rate.

On the other hand, if there occurs no change of the input signal Vi within the predetermined time in step S15, i.e., if a certain time elapses without any change of the input signal Vi, this is regarded as representing a failed condition (step S18). For example, if the flow rate signal is not input to the fuel injection controller from the thermal flow meter for a time sufficiently longer than the cycle of the reference signal, that thermal flow meter is determined to be failed. Then, a fuel injection amount is calculated based on the failure recognition of the thermal flow meter 1A (step S19).

With this Embodiment 3, as described above, since a time factor is added as one of the conditions for failure determination, erroneous failure determination can be avoided even if the reference signal has a level falling within the range set for the failure determination.

Embodiment 4.

Though not shown in FIGS. 1 and 5, a capacitor is usually inserted in parallel to the input impedance Ri and the reference resistance 6 for the purpose of, e.g., removing noises in the signal transmission system. Therefore, the edge of waveform rising and falling of the input signal becomes less sharp.

The signal discrimination is made in FIGS. 4 and 7 based on the change of the input signal Vi. In view of the above, the signal discrimination may be made by detecting and storing the input signal Vi after a predetermined time has elapsed from its change, instead of detecting and storing the input signal Vi immediately after its change.

Embodiment 5.

The signal discrimination between the reference signal and the flow rate signal is made in FIGS. 4 and 7 based on the change of the input signal Vi by using software, but it may be made by using hardware such as a comparator.

Also, the circuit configuration may be modified such that the reference signal is held and the held reference signal is applied to a reference signal input terminal of the A/D converter 4, i.e., such that the reference signal transmitted from the thermal flow meter may be used as a basis for the A/D conversion performed in the A/D converter 4.

By so modifying, since the reference signal from the thermal flow meter and the reference signal for the A/D converter 4 can be regarded as the same, the need of executing a division of the flow rate signal/the reference signal in the microcomputer is eliminated and hence the processing speed can be increased.

Embodiment 6.

Figure 8:
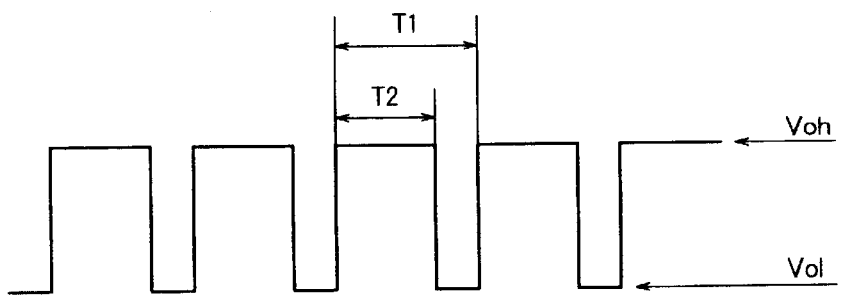
FIG. 8 is a chart for explaining Embodiment 6 of the present invention.

FIG. 8 is a waveform chart for explaining Embodiment 6 of the present invention.

In FIG. 8, there is shown signal waveform from the thermal flow meter outputting a substantially pulse-like signal. The pulse-like signal contains four kinds of signal components representing a frequency (1/T1), duty (T2/T1), "H (high-level)" voltage (Voh), and "L (low-level)" voltage (Vol). In this Embodiment 6, those signal components are given with respective items of information produced in the thermal flow meter.

Let now consider, by way of example, the case of a Kárman's vortex flow meter with an atmospheric pressure and a temperature sensor both built therein. When the pulse-like signal is transmitted on condition, for example, that the frequency represents flow rate information, Voh represents atmospheric pressure information, and the duty represents temperature information, the fuel injection controller can get the flow rate information by detecting the frequency, the atmospheric pressure information by detecting Voh, and the temperature information by detecting the duty through one signal line. As a result, the overall size can be reduced from the structural point of view and reliability of the signal transmission system can be improved.

Alternatively, in Embodiment 1, the frequency and duty may be allocated to represent respectively the temperature information and the atmospheric pressure information.

What is claimed is:

1. A thermal flow meter comprising:
   a flow rate detecting unit for detecting a flow rate signal,
   a reference power supply for generating a reference signal,
   a switch for selectively outputting the flow rate signal from said flow rate detecting unit and the reference signal from said reference power supply; and
   a timing signal generator, wherein said switch selectively outputs the flow rate signal and the reference signal in response to a timing signal from said timing signal generator.

2. A thermal flow meter according to claim 1, further comprising an amplifier for amplifying the flow rate signal and the reference signal and then outputting the amplified signals as voltage signals.

3. A thermal flow meter according to claim 1, further comprising an amnplifier for amplifying the flow rate signal and the reference signal and then outputting the amplified signals as current signals.

4. A thermal flow meter according to claim 1, wherein plural items of information are output via a single transmission line by using plural factors selected from among a frequency, duty cycle and voltage level which are contained in the flow rate signal.

5. A fuel controller comprising:
   a thermal flow meter comprising a flow rate detecting unit for detecting a flow rate signal, a reference power supply for generating a reference signal, and a switch for selectively outputting the flow rate signal from said flow rate detecting unit and the reference signal from said reference power supply;
   a timing signal generator, wherein said switch selectively outputs the flow rate signal and the reference signal in response to a timing signal from said timing signal generator; and
   a signal processor for calculating a flow rate of fuel based on the flow rate signal and the reference signal, from said thermal flow meter.

6. A fuel controller according to claim 5, wherein said signal processor discriminates an input signal from said thermal flow meter and handles the input signal as the reference signal when the input signal is outside a range of the flow rate signal.

7. A fuel controller according to claim 5, wherein said signal processor determines said thermal flow meter to be failed when the input signal from said thermal flow meter exceeds a predetermined value and continues for a predetermined time.

8. A fuel controller according to claim 5, wherein an input impedance of said signal processor is set to be low.

9. A fuel controller according to claim 5, wherein said signal processor comprises an A/D converter and a microcomputer.

10. A fuel controller according to claim 9, wherein the reference signal from said thermal flow meter is held and the held reference signal is used as a reference voltage for said A/D converter.

* * * * *